United States Patent
Lee et al.

(10) Patent No.: US 9,730,207 B2
(45) Date of Patent: Aug. 8, 2017

(54) COMMUNICATION METHOD USING CARRIER AGGREGATION AND APPARATUS FOR SAME

(71) Applicant: LG ELECTRONICS INC., Seoul (KR)

(72) Inventors: Seungmin Lee, Seoul (KR); Hakseong Kim, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 53 days.

(21) Appl. No.: 14/764,511

(22) PCT Filed: Feb. 3, 2014

(86) PCT No.: PCT/KR2014/000899
§ 371 (c)(1),
(2) Date: Jul. 29, 2015

(87) PCT Pub. No.: WO2014/119954
PCT Pub. Date: Aug. 7, 2014

(65) Prior Publication Data
US 2015/0373676 A1    Dec. 24, 2015

Related U.S. Application Data

(60) Provisional application No. 61/759,324, filed on Jan. 31, 2013.

(51) Int. Cl.
*H04W 72/04* (2009.01)
*H04L 5/00* (2006.01)
(Continued)

(52) U.S. Cl.
CPC .......... *H04W 72/042* (2013.01); *H04L 5/001* (2013.01); *H04L 5/0094* (2013.01); *H04L 5/14* (2013.01);
(Continued)

(58) Field of Classification Search
CPC .................................................. H04W 72/042
See application file for complete search history.

(56) References Cited

U.S. PATENT DOCUMENTS 8,797,924 B2 * 8/2014 Tseng ................. H04W 76/048
                                                      370/280
8,861,408 B2 * 10/2014 Damnjanovic ....... H04L 1/1607
                                                      370/280
9,019,850 B2 * 4/2015 Chen .................... H04W 24/10
                                                      370/252

(Continued)

FOREIGN PATENT DOCUMENTS

KR    1020120085833 A    8/2012
KR    1020120135526 A    12/2012
(Continued)

*Primary Examiner* — Andrew Lai
*Assistant Examiner* — Andrew C Lee
(74) *Attorney, Agent, or Firm* — Dentons US LLP

(57) ABSTRACT

The present invention relates to a method of transmitting/receiving a signal by a UE in a wireless communication system supporting carrier aggregation. The method includes the steps of: receiving a configuration for aggregating a component carrier in a frequency division duplex (FDD) mode and a component carrier in a time division duplex (TDD) mode; and transmitting/receiving a signal using a primary component carrier and a secondary component carrier determined according to the configuration, wherein the primary component carrier and the secondary component carrier support different modes.

10 Claims, 13 Drawing Sheets

(51) Int. Cl.
 *H04L 27/26* (2006.01)
 *H04L 5/14* (2006.01)
(52) U.S. Cl.
 CPC ..... *H04L 27/2602* (2013.01); *H04W 72/0446* (2013.01); *H04W 72/0493* (2013.01); *H04W 72/0453* (2013.01)

(56) References Cited

U.S. PATENT DOCUMENTS

| | | | | |
|---|---|---|---|---|
| 9,042,277 | B2* | 5/2015 | Chen | H04L 5/001 370/280 |
| 9,125,188 | B2* | 9/2015 | Tamaki | H04L 1/1854 |
| 9,160,493 | B2* | 10/2015 | Ahn | H04L 1/1614 |
| 9,209,953 | B2* | 12/2015 | Yang | H04L 5/001 |
| 2010/0234037 | A1* | 9/2010 | Terry | H04L 1/0023 455/450 |
| 2011/0249641 | A1* | 10/2011 | Kwon | H04W 74/0833 370/329 |
| 2011/0280164 | A1* | 11/2011 | Luo | H04L 5/001 370/281 |
| 2012/0106404 | A1* | 5/2012 | Damnjanovic | H04L 5/001 370/279 |
| 2012/0163288 | A1* | 6/2012 | Kim | H04L 5/0094 370/315 |
| 2012/0218954 | A1* | 8/2012 | Barbieri | H04L 5/003 370/329 |
| 2012/0257552 | A1* | 10/2012 | Chen | H04L 5/001 370/280 |
| 2013/0038205 | A1* | 2/2013 | Nakamura | G02B 5/201 313/504 |
| 2013/0242813 | A1* | 9/2013 | Wang | H04L 5/001 370/280 |

FOREIGN PATENT DOCUMENTS

| | | |
|---|---|---|
| WO | 2012061410 A2 | 5/2012 |
| WO | 2012108718 A2 | 8/2012 |
| WO | 2012142123 A2 | 10/2012 |

* cited by examiner

FIG. 2
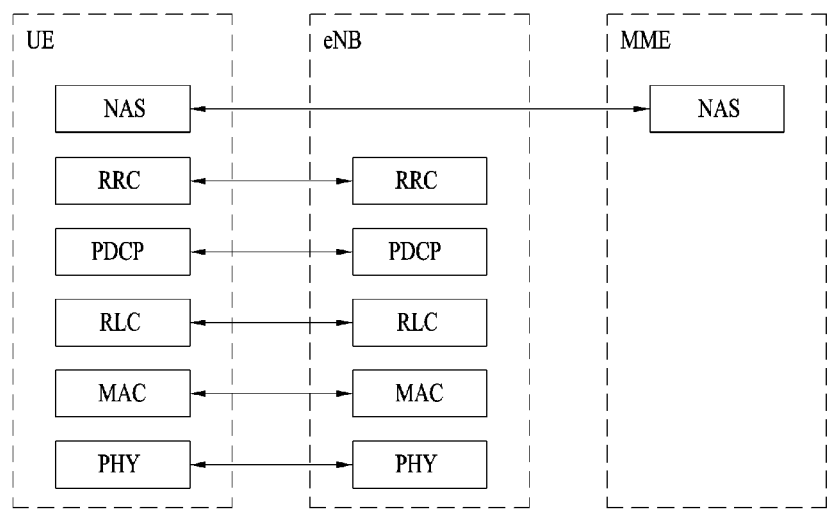
(a) control-plane protocol stack
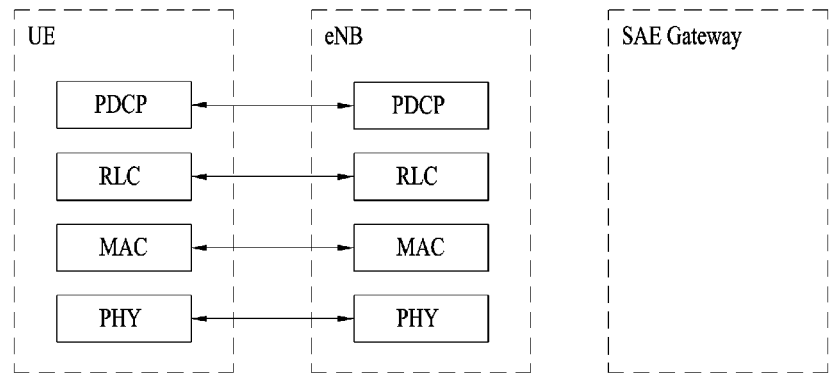
(b) user-plane protocol stack FIG. 7
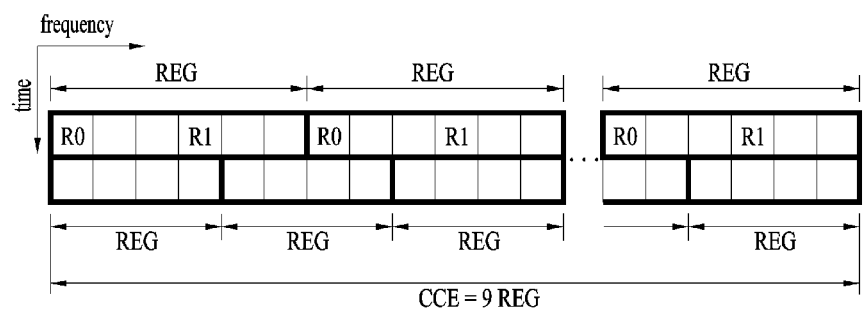
(a) 1 TX or 2 TX
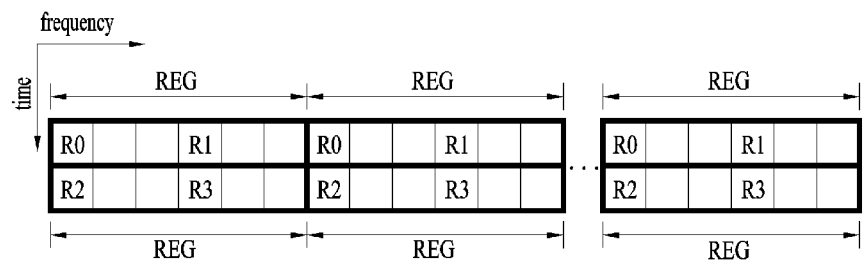
(b) 4 TX FIG. 11
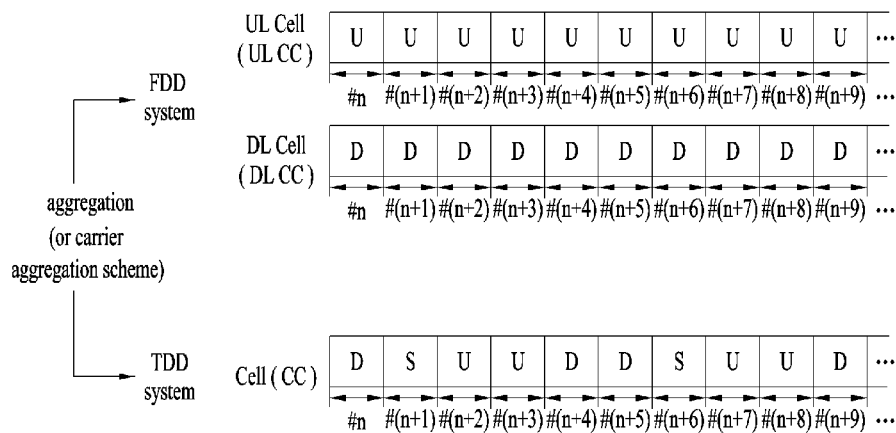
FIG. 12
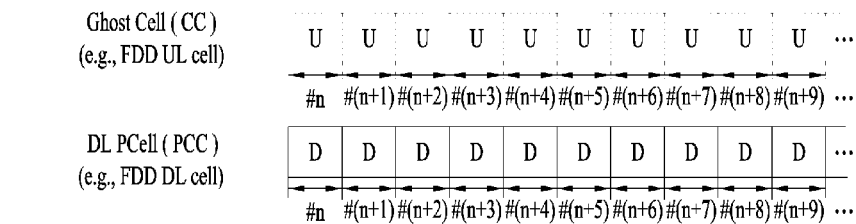
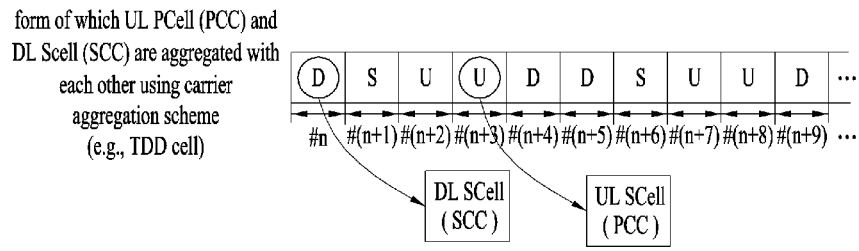

COMMUNICATION METHOD USING CARRIER AGGREGATION AND APPARATUS FOR SAME

This application is a National Stage Application of International Application No. PCT/KR2014/000899, filed on Feb. 3, 2014, which claims the benefit of U.S. Provisional Application No. 61/759,324, filed on Jan. 31, 2013, all of which are hereby incorporated by reference in their entirety for all purposes as if fully set forth herein.

TECHNICAL FIELD

The present invention relates to a wireless communication system, and more particularly, to a method of performing communication using carrier aggregation and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE OF THE INVENTION

Technical Task

An object of the present invention is to provide a method of performing communication using carrier aggregation in a wireless communication system and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transceiving a signal, which is transceived by a user equipment in a wireless communication system supporting carrier aggregation, includes the steps of receiving a configuration for aggregating a component carrier in an FDD (frequency division duplex) mode and a component carrier in a TDD (time division duplex) mode with each other and transceiving a signal using a primary component carrier and a secondary component carrier determined according to the configuration. In this case, the primary component carrier and the secondary component carrier may support modes different from each other.

Preferably, information on the configuration may indicate the component carrier in the TDD mode to be used as a primary component carrier for downlink communication, may indicate a downlink component carrier in the FDD mode to be used as a secondary component carrier for the downlink communication and may indicate an uplink component carrier in the FDD mode not to be used.

Preferably, information on the configuration may indicate the component carrier in the TDD mode to be used as a primary component carrier for uplink communication, may indicate an uplink component carrier in the FDD mode to be used as a secondary component carrier for the uplink communication and may indicate a downlink component carrier in the FDD mode not to be used.

Preferably, information on the configuration may indicate the component carrier in the TDD mode to be used as a primary component carrier for downlink communication, may indicate a downlink component carrier in the FDD mode to be used as a secondary component carrier for the downlink communication and may indicate uplink subframes in the TDD mode not to be used.

Preferably, information on the configuration may indicate an uplink component carrier in the FDD mode to be used as a primary component carrier for uplink communication, may indicates the component carrier in the TDD mode to be used as a secondary component carrier for the uplink communication and may indicates a downlink component carrier in the FDD mode not to be used.

Preferably, information on the configuration may indicate the component carrier in the TDD mode to be used as a primary component carrier for uplink communication, may indicate an uplink component carrier in the FDD mode to be used as a secondary component carrier for the uplink communication and may indicate downlink subframes in the TDD mode not to be used.

Preferably, information on the configuration may indicate a downlink component carrier in the FDD mode to be used as a primary component carrier for downlink communication, may indicate the component carrier in the TDD mode to be used as a secondary component carrier for the downlink communication and may indicate an uplink component carrier in the FDD mode not to be used.

Preferably, information on the configuration may indicate a downlink component carrier in the FDD mode to be used as a primary component carrier for downlink communication, may indicate the component carrier in the TDD mode to be used as a secondary component carrier for the downlink communication and may indicate downlink subframes in the TDD mode not to be used.

Preferably, information on the configuration may indicate a downlink component carrier in the FDD mode to be used as a primary component carrier for downlink communication, may indicate the component carrier in the TDD mode to be used as a secondary component carrier for the downlink communication and may indicate uplink subframes in the TDD modes not to be used.

To further achieve these and other advantages and in accordance with the purpose of the present invention, according to a different embodiment, a user equipment transceiving a signal in a wireless communication system supporting carrier aggregation includes an RF (radio frequency) unit and a processor, the processor configured to receive a configuration for aggregating a component carrier in an FDD (frequency division duplex) mode and a component carrier in a TDD (time division duplex) mode with each other, the processor configured to transceive a signal using a primary component carrier and a secondary component carrier determined according to the configuration. In this case, the primary component carrier and the secondary component carrier may support modes different from each other.

Advantageous Effects

According to the present invention, it is able to efficiently perform communication using carrier aggregation in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram for structures of control and user planes of radio interface protocol between a 3GPP radio access network standard-based user equipment and E-UTRAN;

FIG. 7 is a diagram for a resource unit used for configuring a downlink control channel in LTE system;

FIG. 11 is a diagram for an example of using a FDD system and a TDD system with a carrier aggregation scheme;

FIG. 12 is a diagram for an example of using a FDD system and a TDD system in a manner of applying a carrier aggregation scheme to the FDD system and the TDD system according to one embodiment of the present invention;

BEST MODE

Mode for Invention

Figure 1:
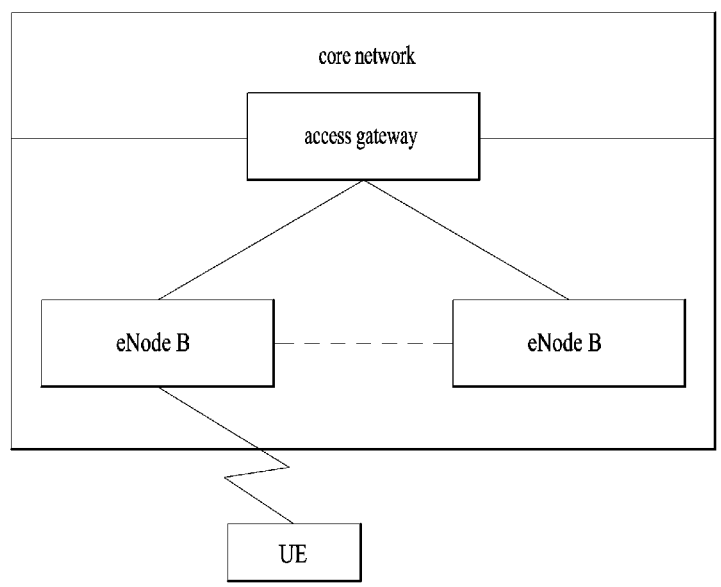
FIG. 1 is a schematic diagram of E-UMTS network structure as one example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
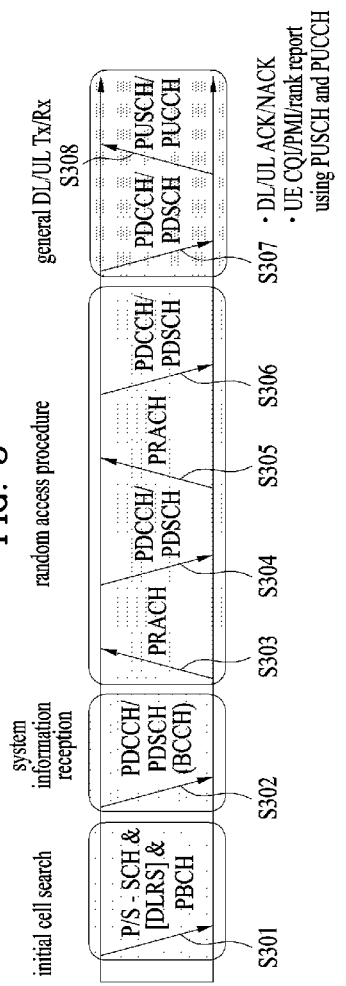
FIG. 3 is a diagram for explaining physical channels used for 3GPP system and a general signal transmission method using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
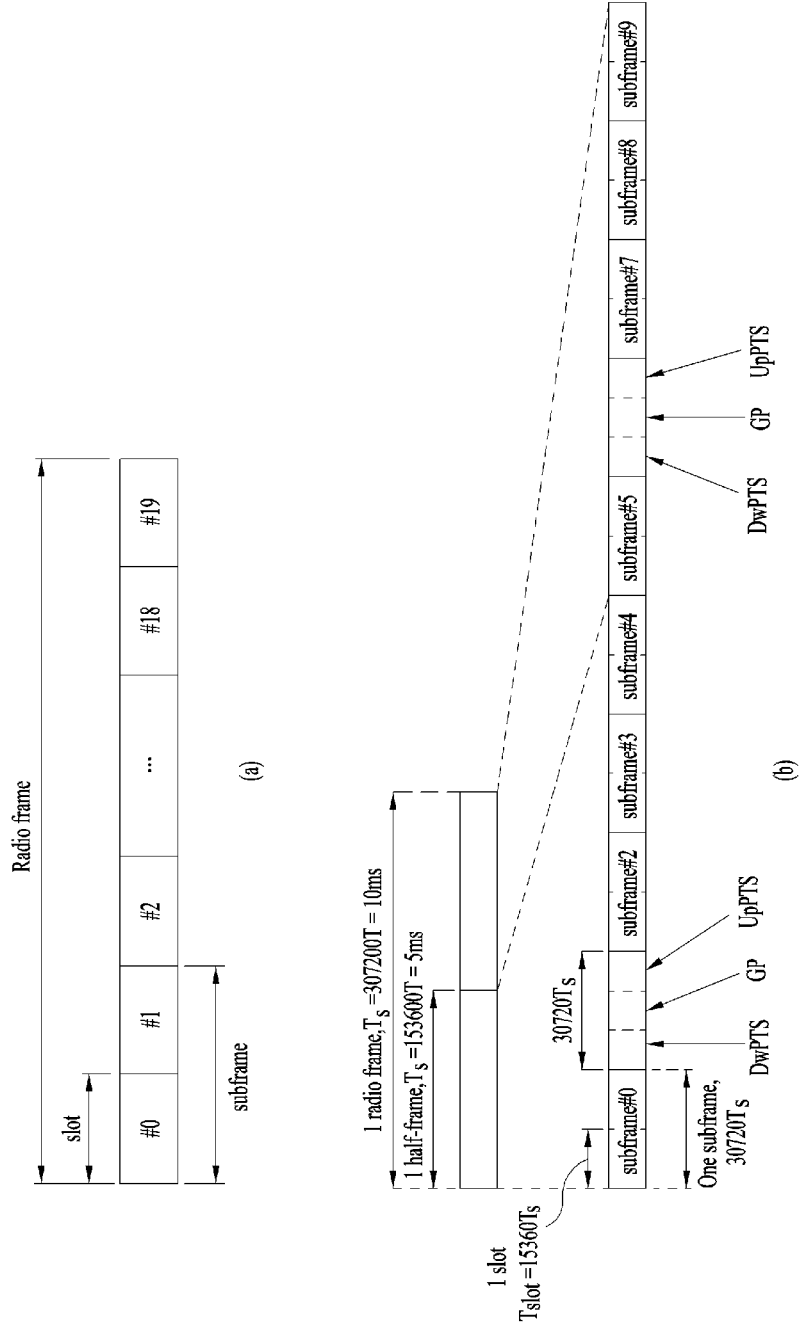
FIG. 4 is a diagram for a structure of a radio frame in LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols.

At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of, and the other region is configured for the guard period.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
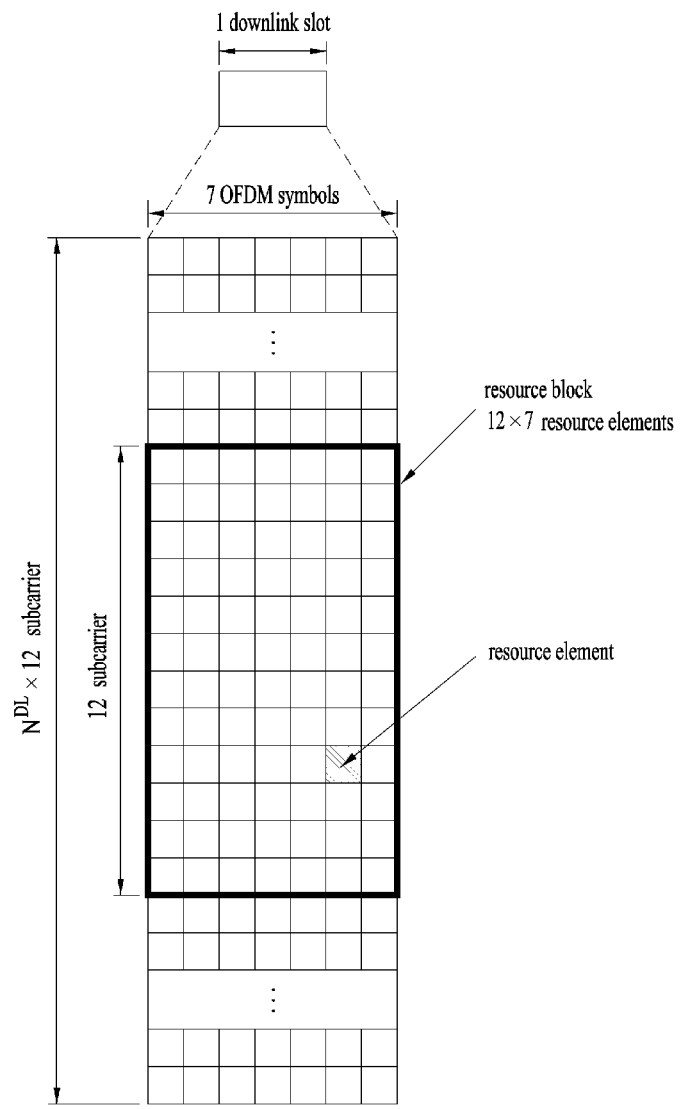
FIG. 5 is a diagram of a resource grid for a downlink slot.

FIG. 5 is a diagram illustrating a resource grid of a downlink slot.

Referring to FIG. 5, the downlink slot includes a plurality of $N_{symb}^{DL}$ OFDM symbols in a time domain and a plurality of $N_{RB}^{DL}$ resource blocks in a frequency domain. Since each resource block includes $N_{sc}^{RB}$ subcarriers, the downlink slot includes $N_{RB}^{DL} \times N_{sc}^{RB}$ subcarriers in the frequency domain. Although FIG. 5 illustrates that the downlink slot includes seven OFDM symbols and the resource block includes twelve subcarriers, it is to be understood that the downlink slot and the resource block are not limited to the example of FIG. 5. For example, the number of OFDM symbols included in the downlink slot may be varied depending on the length of the CP.

Each element on the resource grid will be referred to as a resource element (RE). One resource element is indicated by one OFDM symbol index and one subcarrier index. One RB includes $N_{symb}^{DL} \times N_{sc}^{RB}$ number of resource elements. The number $N_{RB}^{DL}$ of resource blocks included in the downlink slot depends on a downlink transmission bandwidth configured in the cell.

Figure 6:
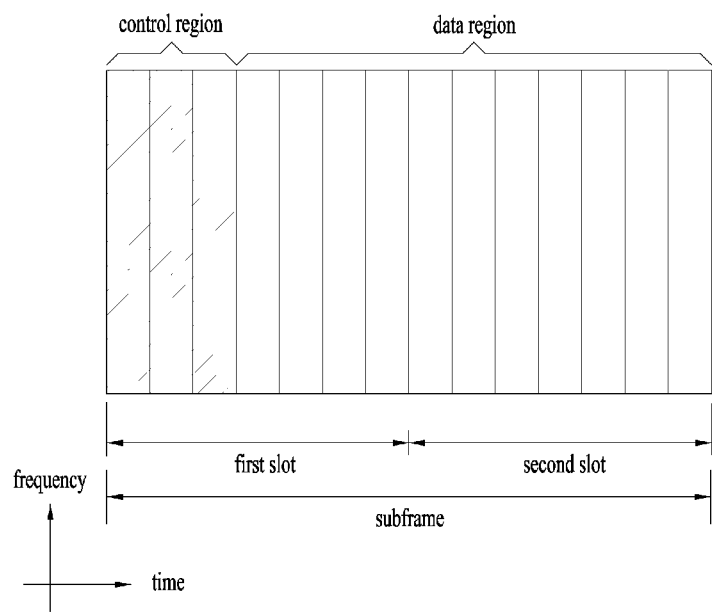
FIG. 6 is a diagram for an example of a structure of a downlink subframe.

FIG. 6 is a diagram illustrating a structure of a downlink subframe.

Referring to FIG. 6, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (Hybrid Automatic Repeat reQuest acknowledgement/negative-acknowledgement) signals in response to uplink transmission.

The control information transmitted through the PDCCH will be referred to as downlink control information (DCI). The DCI includes resource allocation information for a user equipment or user equipment group. For example, the DCI includes uplink/downlink scheduling information, uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

FIG. 7 is a diagram for a resource unit used for configuring a downlink control channel in LTE system. In particular, FIG. 7(a) indicates a case that the number of transmitting antennas of an eNode B corresponds to 1 or 2 and FIG. 7(b) indicates a case that the number of transmitting antennas of the eNode B corresponds to 4. A reference signal (RS) pattern varies according to the number of transmitting antennas but a method of configuring a resource unit in relation to a control channel is identical irrespective of the number of transmitting antennas.

Referring to FIG. 7, a base resource unit of a downlink control channel is a REG (resource element group). The REG consists of 4 neighboring resource elements except an RS. The REG is represented in the drawing with a bold line. The PCFICH and the PHICH include 4 REGs and 3 REGs, respectively. The PDCCH consists of a CCE (control channel element) unit and one CCE includes 9 REGs.

In order for a UE to check whether the PDCCH consisting of L number of CCEs is transmitted to the UE, the UE is configured to check the CCEs contiguously arranged by $M^{(L)}$ ($\geq L$) number of CCEs or a specific rule. A value of the L, which should be considered for the UE to receive the PDCCH, may become a plural number. The UE should check CCE aggregations to receive the PDCCH. The CCE aggregations are called a search space. As an example, the search space is defined by LTE system as Table 3 in the following.

TABLE 3

| | Search space $S_k^{(L)}$ | | Number of PDCCH |
|---|---|---|---|
| Type | Aggregation level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In this case, CCE aggregation level L indicates the number of CCE consisting of PDCCH, $S_k^{(L)}$ indicates a search space of the CCE aggregation level L and $M^{(L)}$ indicates the number of candidate PDCCHs monitored in the search space of the aggregation level L.

The search space can be classified into a UE-specific search space accessible by a specific UE only and a common search space accessible by all UEs in a cell. A UE monitors the common search space of which the CCE aggregation level corresponds to 4 and 8 and monitors the UE-specific search space of which the CCE aggregation level corresponds to 1, 2, 4, and 8. The common search space and the UE-specific search space may overlap with each other.

And, a position of a first (having a smallest index) CCE in a PDCCH search space, which is given to a random UE for each CCE aggregation level value, varies in every subframe depending on a user equipment. This is called a PDCCH search space hashing.

The CCE can be distributed to a system band. More specifically, a plurality of CCEs, which are logically contiguous, can be inputted to an interleaver. The interleaver performs a function of mixing a plurality of the CCEs with each other in REG unit. Hence, frequency/time resources forming a CCE are physically distributed in the total frequency/time domain within a control region of a subframe. Consequently, although a control channel is constructed in a CCE unit, the interleaving is performed in an REG unit. Hence, frequency diversity and interference randomization gain can be maximized.

Figure 8:
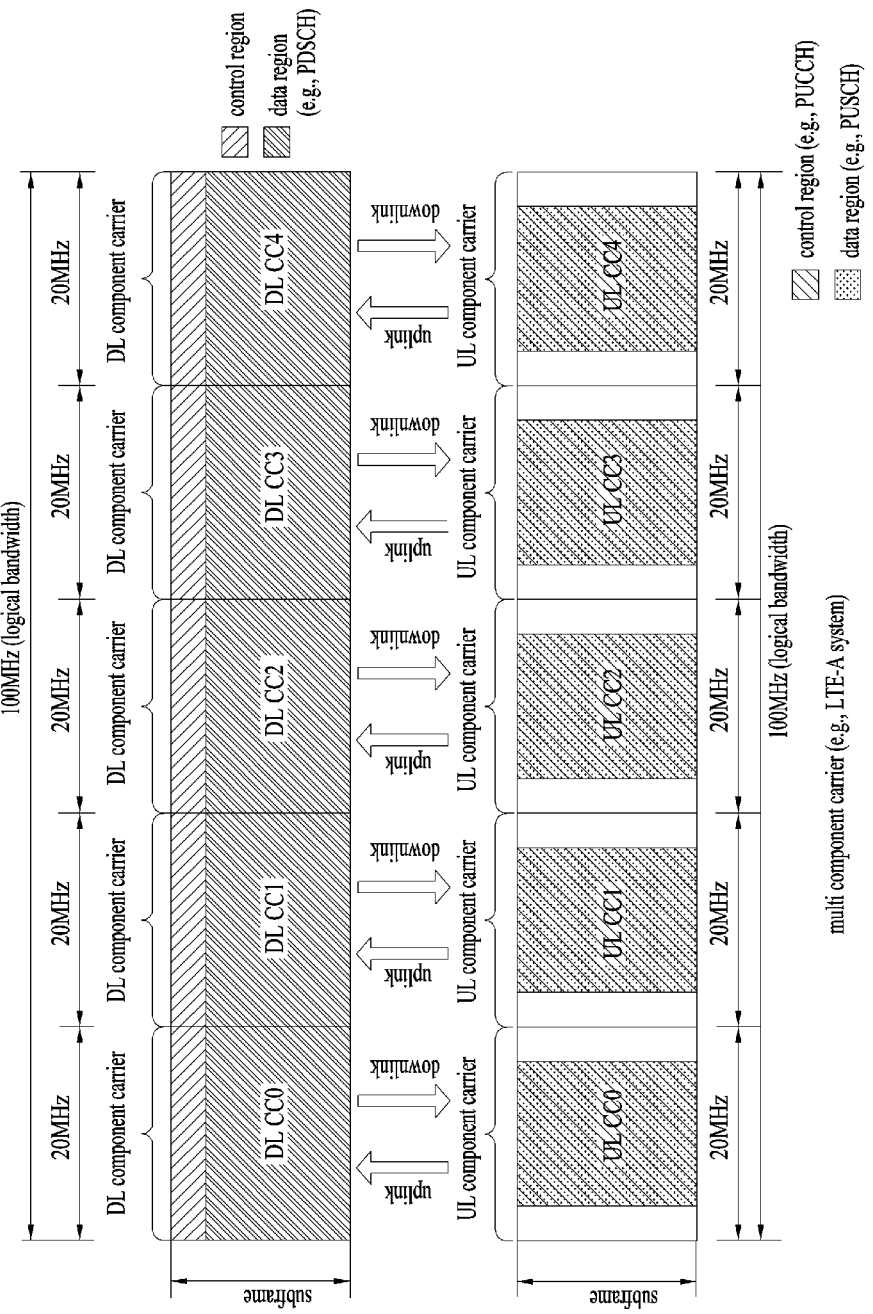
FIG. 8 is a diagram for an example of a carrier aggregation (CA) communication system.

FIG. 8 is a diagram for an example of a carrier aggregation (CA) communication system.

Referring to FIG. 11, a wider UL/DL bandwidth can be supported in a manner of aggregating a plurality of UL/DL component carriers (CC). The terminology 'component carrier' can be replaced by such an equivalent terminology as a carrier, a cell, and the like. Each of the component carriers may be adjacent to each other or non-adjacent to each other in frequency domain. The bandwidth of each of the component carriers can be determined independently. An asymmetric carrier aggregation, which means that the number of downlink component carrier (DL CC) and the number of uplink component carrier (UL CC) are different from each other, is also possible. Meanwhile, control information can be set to be transceived on a specific CC only. The specific CC is called a primary CC and the rest of CCs may be called a secondary CC.

As an example, in case that a cross-carrier scheduling (or a cross-CC scheduling) is applied, PDCCH for DL assignment is transmitted on a DL CC #0 and a corresponding PDSCH can be transmitted on a DL CC #2. For a cross-CC scheduling, introduction of a CIF (carrier indicator field) can be considered. Whether a CIF exists or not within a PDCCH can be semi-statically and user-specifically (or user group-specifically) configured via an upper layer signaling (e.g., RRC signaling). A baseline of PDCCH transmission can be summarized as follows.

CIF disabled: PDCCH on DL CC allocates a PDSCH resource on the same DL CC or a PUSCH resource on a singly linked UL CC.

No CIF

Identical to LTE PDCCH structure (identical coding, identical CCE-based resource mapping) and DCI format CIF enabled: PDCCH on DL CC allocates a PDSCH or PUSCH resource on a specific DL/UL CC among a plurality of aggregated DL/UL CCs using a CIF.

Expanded LTE DCI format including a CIF

CIF (if configured) is a stationary x-bit field (e.g., x=3)

CIF (if configured) position is fixed irrespective of a DCI format size

Reuse of LTE PDCCH structure (identical coding, identical CCE-based resource mapping)

In case that a CIF exists within a PDCCH, a base station may be able to assign a PDCCH monitoring DL CC set to reduce BD complexity of a user equipment side. The PDCCH monitoring DL CC set is a part of aggregated whole DL CC and includes at least one DL CC. A user equipment may be able to perform a detection/decoding of the PDCCH on a corresponding DL CC only. In particular, for a scheduling of PDSCH/PUSCH, the base station may be able to transmit the PDCCH on the PDCCH monitoring DL CC only. The PDCCH monitoring DL CC set may be configured UE-specifically, UE group-specifically or cell-specifically. The terminology 'PDCCH monitoring DL CC' can be replaced by such an equivalent terminology as a monitoring carrier, a monitoring cell, and the like. And, a CC aggregated for a user equipment can be replaced by such an equivalent terminology as a serving CC, a serving carrier, a serving cell, and the like.

Figure 9:
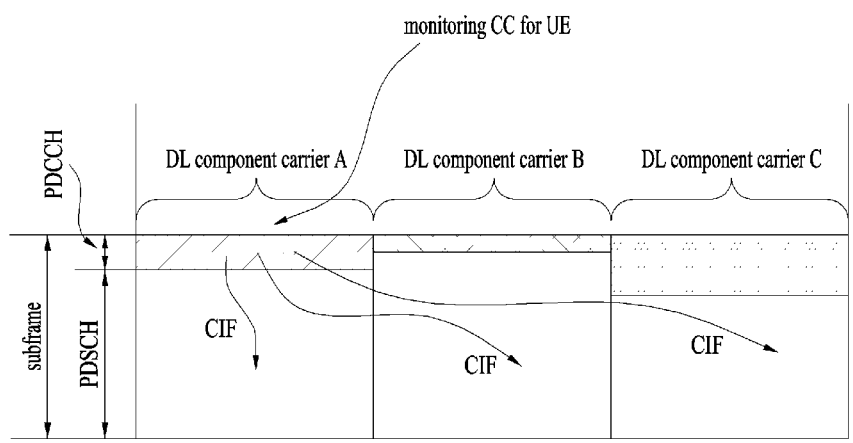
FIG. 9 is a diagram for an example of scheduling in case of aggregating a plurality of carriers with each other.

FIG. 9 is a diagram for an example of a scheduling in case that a plurality of carriers are aggregated with each other. Assume that 3 DL CCs are aggregated and a DL CC A is configured as a PDCCH monitoring DL CC. DL CC A~C can be called a serving CC, a serving carrier, a serving cell, and the like. If a CIF is disabled, each of DL CCs may be able to transmit PDCCH, which schedules PDSCH of each of the DL CCs, only without a CIF according to an LTE PDCCH rule. On the other hand, if a CIF is enabled by an (UE group-specific or cell-specific) upper layer signaling, the DL CC A (monitoring DL CC) may be able to transmit the PDCCH, which schedules the PDSCH of a different DL CC, as well as the PDSCH of the DL CC A using the CIF. In this case, PDCCH is not transmitted on DL CC B and DL CC C, which are not configured as the PDCCH monitoring DL CC. Hence, the DL CC A (monitoring DL CC) should include all of a PDCCH search space related to the DL CC A, a PDCCH search space related to the DL CC B, and a PDCCH search space related to the DL CC C. In the present specification, assume that a PDCCH search space is defined according to a carrier.

As mentioned in the foregoing description, LTE-A considers a use of a CIF in PDCCH to perform a cross-CC scheduling. Whether to use a CIF (i.e., supporting a cross-CC scheduling mode or a non-cross-CC scheduling mode) and switching between modes can be semi-statically/UE-specifically configured via an RRC signaling. After the RRC signaling process is underwent, a user equipment can recognize whether a CIF is used in PDCCH to be scheduled for the user equipment.

Figure 10:
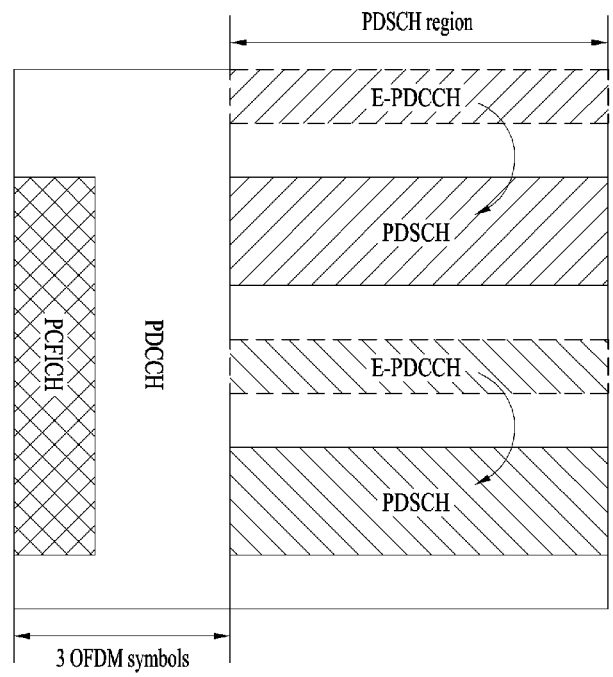
FIG. 10 is a diagram for an example of EPDCCH and PDSCH scheduled by the EPDCCH.

FIG. 10 is a diagram for an example of EPDCCH and PDSCH scheduled by the EPDCCH.

Referring to FIG. 10, in general, EPDCCH can be used in a manner of defining a part of a PDSCH region transmitting data and a UE should perform blind decoding to detect whether the UE detects EPDCCH of the UE. Although EPDCCH performs a scheduling operation (i.e., PDSCH, PUSCH control) identical to a scheduling operation of a legacy PDCCH, if the number of UEs accessing such a node as an RRH is increasing, the greater numbers of EPDCCHs are assigned to a PDSCH region and the count of blind decoding performed by a UE is increasing. Hence, there may exist a demerit in that complexity may increase.

In the following, the present invention is explained based on the contents discussed in the foregoing description. The present invention proposes a method of performing communication between a base station and a user equipment efficiently using (or aggregating) systems different from each other with a carrier aggregation (CA) scheme. in this case, the systems different from each other may become a FDD system and a TDD system. If the present invention is applied, the base station is able to allocate or (re)configure a radio resource usage more appropriate for a load state change of the base station.

In the following description, for clarity, a proposed scheme of the present invention is explained based on a 3GPP LTE system. Yet, a range of a system to which the present invention is applied can be extended to a different system except the 3GPP LTE system. And, embodiments of the present invention can be applied to user equipments only capable of applying a carrier aggregation scheme to a cell (or a component carrier) of systems different from each other. Or, the embodiments of the present invention can be applied to all user equipments capable of applying the carrier aggregation scheme (according to a predetermined configuration and the like). And, the embodiments of the present invention can be limitedly applied to user equipments equipped with a full duplex capability only.

In the following, for clarity, assume a situation that communication is performed in a manner of using (or aggregating) a FDD system and a TDD system with a carrier aggregation scheme. In this case, a base station can be configured to inform a user equipment of information indicating that systems different from each other are used (or aggregated with each other) using a carrier aggregation scheme and/or information on a cell (or a component carrier) of the systems different from each other to which the carrier aggregation scheme is applied via a predefined signal including i) a physical layer signal (e.g., (E)PDCCH/PDSCH), ii) a upper layer signal (e.g., MAC/RRC), or iii) a system information transmission channel (e.g., SIB/MIB/PBCH).

FIG. 11 is a diagram for an example of using (aggregating) a FDD system and a TDD system with a carrier aggregation scheme. In FIG. 11, assume a case that a UL-DL configuration of a TDD system is defined by a UL-DL configuration #1.

According to the present invention, in a situation that a FDD system and a TDD system are used in accordance with a carrier aggregation scheme, a base station sets a downlink bandwidth (or a downlink cell/component carrier) of the FDD system to a user equipment as a DL PCell (downlink primary cell) and may be able to configure an uplink bandwidth (or an uplink cell/component carrier) of the FDD system to be considered as a sort of virtual bandwidth (or a cell/component carrier), which is not practically used. In particular, according to the present invention, a sort of the virtual bandwidth, which is not practically used, can be configured to be considered as a ghost cell or a ghost CC.

In this case, a bandwidth (or a cell/component carrier) of the TDD system can be configured to be considered as a form of which a plurality of predetermined cells or a plurality of component carriers are aggregated with each other according to the carrier aggregation scheme. Specifically, sets (and/or a set of UpPTS) of uplink subframes on a bandwidth (or a cell/component carrier) of the TDD system can be considered as resources on a UL PCell and sets (and/or a set of DwPTS) of downlink subframes on a bandwidth (or a cell/component carrier) of the TDD system can be configured to be considered as resources on a DL Scell.

And, special subframe sets (and/or DwPTS set and/or UpPTS set) on the TDD system bandwidth (or a cell/component carrier) can be configured to be considered as resources on a (DL/UL) Scell according to a predetermined configuration. Yet, in some cases, the special subframe sets can be configured to be considered as resources on a (DL/UL) PCell according to a predetermined configuration.

Hence, according to the present invention, it is able to manage a virtual TDD system based on a bandwidth (or a cell/component carrier) of which all subframes are configured for the use of downlink. Hence, when downlink load on a system increases, a base station can allocate an amount of downlink radio resources greater than that of a legacy TDD system to user equipments.

Moreover, a base station can inform a user equipment of i) information on whether to apply embodiment according to the present invention, ii) and/or information on a type (Pcell/Scell/ghost cell) setting of each bandwidth (or cell/component carrier), iii) and/or configuration information on interpretation of the user equipment for a specific bandwidth (or cell/component carrier) via a predetermined signal (e.g., a physical layer signal/upper layer signal/system information transport channel). Or, it may be able to configure the user equipment to implicitly identify the aforementioned information according to a predetermined configuration.

FIG. 12 is a diagram for an example of using a FDD system and a TDD system in a manner of applying a carrier aggregation scheme to the FDD system and the TDD system according to one embodiment of the present invention.

Referring to FIG. 12, a downlink bandwidth (or a cell/component carrier) of a FDD system is configured to be considered as a DL PCell and an uplink bandwidth (or a cell/component carrier) is configured to be considered as a ghost cell according to embodiment of the present invention. And, a bandwidth (or a cell/component carrier) of a TDD system is configured to be considered as a form of which a UL PCell (i.e., uplink subframe set and/or UpPTS set) and a DL Scell (i.e., downlink subframe set and/or DwPTS set) are aggregated with each other via a carrier aggregation scheme.

According to the present invention, communication to which the carrier aggregation scheme is applied is efficient for performing an operation of mitigating interference between base stations in case that an individual cell of a TDD system changes a radio resource usage according to a system load state of the individual cell. In particular, in order for a base station performing downlink communication in a specific subframe timing to mitigate interference interfering communication of a different adjacent base station performing uplink communication in the specific subframe timing, it may be able to configure downlink transmit power to be relatively low. Yet, if a specific base station configures downlink transmit power (e.g., reference signal/control channel/data channel transmit power) on a PCell to be low, it may cause a problem on an operation of a user equipment receiving PCell-based system information (e.g., MIB (PBCH)/PAGING/SIB) and/or an operation of the user equipment maintaining a communication link (e.g., RLM/RRM) with the PCell.

Hence, in order to solve the aforementioned problems, as shown in FIG. 12, according to the present invention, a downlink bandwidth of the FDD system is configured by a DL PCell and an uplink bandwidth of the FDD system is configured by a sort of a virtual bandwidth to solve the aforementioned technical task.

Specifically, since a downlink subframe set on a TDD system bandwidth (or a cell/component carrier) is configured to be considered as a DL Scell and a downlink bandwidth (or a cell/component carrier) of a FDD system is configured to be considered as a DL PCell, the aforementioned problem caused by the configuration of the relatively low downlink transmit power on the PCell can be solved. And, if a base station configures downlink transmit power on a DL Scell to be low on specific subframe timing, interference on a different adjacent base station performing uplink communication on the specific subframe timing can be reduced.

Moreover, the present invention can also be used to designate a (new) TDD UL-DL configuration consisting of downlink subframes only (i.e., a configuration consisting of uplink subframes only or a configuration consisting of downlink subframes only does not exist in a legacy TDD UL-DL configurations) to a user equipment. Or, the present invention can also be used to make the user equipment interpret a (new) TDD UL-DL configuration consisting of downlink subframes only.

In particular, if a FDD system-related bandwidth (or a cell/component carrier) and a TDD system-related bandwidth (or a cell/component carrier) are aggregated with each other according to the present invention, a base station can configure a (new) virtual TDD UL-DL configuration consisting of downlink subframes only to a user equipment. Specifically, an uplink bandwidth (or a cell/component carrier) of a FDD system and/or an uplink subframe set of a TDD system (and/or a downlink subframe set of the TDD system) can be considered as a ghost cell-related resource (or an Scell-related resource) and a downlink bandwidth (or a cell/component carrier) of the FDD system (and/or a downlink subframe set of the TDD system) can be considered as a sort of virtual (new) TDD UL-DL configuration consisting of downlink subframes only. In this case, as an example, subframes, which corresponds to a position of uplink subframe set of the TDD system on the virtual (new) TDD UL-DL configuration consisting of downlink subframes only, can be interpreted as a usage of an uplink subframe is changed to a usage of downlink due to a dynamic change of a radio resource usage.

And, (when carrier aggregation (CA) is not applied,) an uplink subframe can be interpreted as a resource (or a Scell-related resource) interlocked with a ghost cell in a state that a bandwidth according to a TDD system exists only for a user equipment. In this case, the user equipment is able to consider it as the uplink subframe is used for downlink communication. By doing so, the virtual (new) TDD UL-DL configuration consisting of downlink subframes only can be set to the user equipment. Moreover, whether to use the uplink subframe interlocked with the ghost cell (or Scell-related uplink subframe) for downlink communication can be determined according to i) a rule/configuration predetermined between a base station and the user equipment or ii) the base station may be able to indicate the user equipment to use the uplink subframe via separate signaling (e.g., upper layer signaling/physical channel) and the like.

Figure 13:
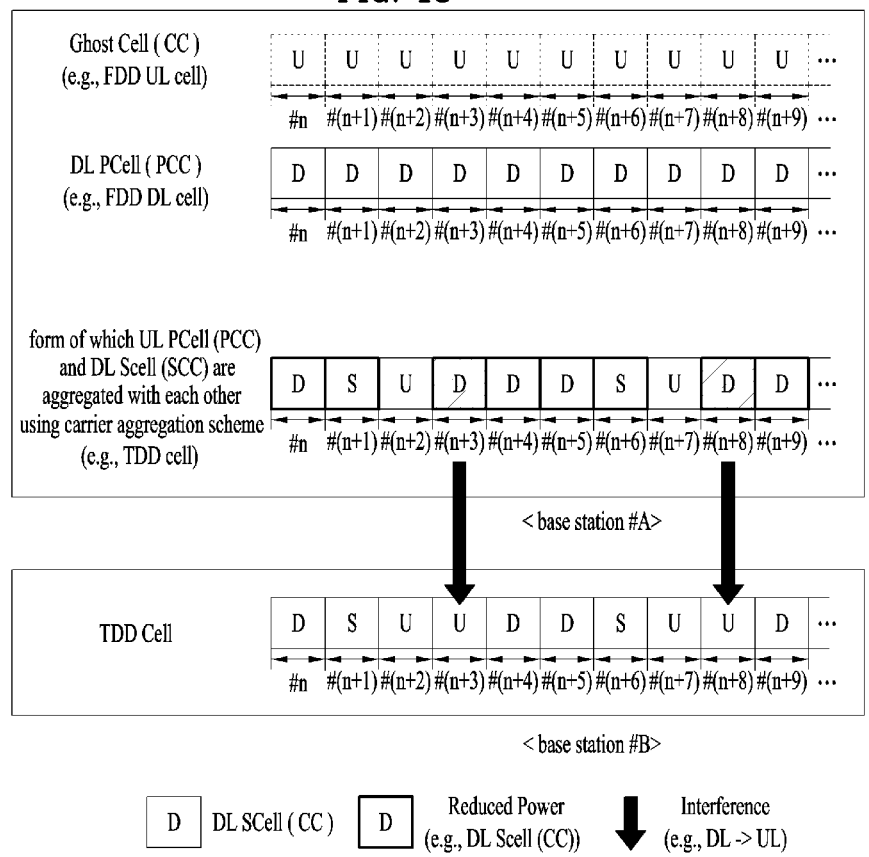
FIG. 13 is a diagram for a case of configuring downlink transmit power to mitigate interference between a plurality of base stations.

FIG. 13 shows a case that a base station #A configures downlink transmit power on a DL Scell to be low on specific subframe timing to reduce interference on a base station #B performing uplink communication on the specific subframe timing. In FIG. 13, assume that the base station #B (and/or the base station #A) changes a radio resource usage according to a system load state of the base station #B.

According to the present invention, as shown in FIG. 13, in a situation that a FDD system and a TDD system are aggregated with each other using a carrier aggregation scheme, a base station sets an uplink bandwidth (or a cell/component carrier) of the FDD system to a user equipment as a UL PCell and may be able to configure a downlink bandwidth (or a cell/component carrier) of the FDD system to be considered as a sort of virtual bandwidth (or a ghost cell/ghost CC), which is not practically used.

For instance, a bandwidth (or a cell/component carrier) of the TDD system can be configured to be considered as a form of which a plurality of predetermined cells (or component carriers) are aggregated with each other via the carrier aggregation scheme. Specifically, downlink subframe sets (and/or DwPTS sets) on the bandwidth (or a cell/component carrier) of the TDD system can be considered as resources on a DL PCell and uplink subframe sets (and/or UpPTS sets) on the bandwidth (or a cell/component carrier) of the TDD system can be configured to be considered as resources on an UL Scell.

As exceptionally mentioned in the foregoing description, special subframe sets (and/or DwPTS sets and/or UpPTS sets) on the bandwidth of the TDD system can be considered as resources on (DL/UL) PCell according to a predetermined configuration or can be configured to be considered as resources on (DL/UL) Scell according to a predetermined configuration.

Hence, it is able to manage a virtual TDD system based on a cell (or a component carrier or a bandwidth) of which all subframes are configured by an uplink usage. And, if uplink load on a system increases, a base station can allocate an amount of uplink radio resources greater than that of a legacy TDD system to user equipments.

Figure 14:
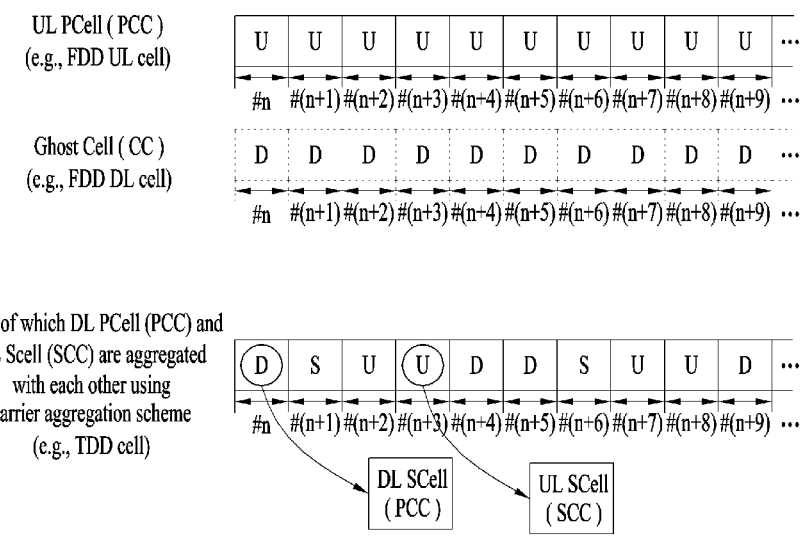
FIG. 14 is a diagram for an example of using a FDD system and a TDD system with a carrier aggregation scheme according to a different embodiment of the present invention.

FIG. 14 shows a case that an uplink bandwidth of a FDD system is configured by a UL PCell and a downlink bandwidth of the FDD system is configured by a sort of virtual bandwidth according to one embodiment of the present invention.

Hence, according to the present invention, in case of using a FDD system and a TDD system with a carrier aggregation scheme, a base station can inform a user equipment of DL PCell/Scell, UL PCell/Scell, ghost cell configuration information and the like in a form of a partial combination of embodiments described in the following.

In the following, examples for information of a combination form capable of being informed to a user equipment by a base station are explained. These are just examples for clarity of explaining the present invention. Hence, the present invention may be non-limited by the examples. For clarity, it is defined as a downlink subframe set on a TDD system includes a downlink subframe and/or a set of DwPTS and an uplink subframe set on the TDD system includes an uplink subframe and/or a set of UpPTS.

The downlink subframe set and the uplink subframe set on a bandwidth (or a cell/component carrier) of the TDD system are configured to be considered as a DL PCell and a UL PCell, respectively. A downlink bandwidth (or a cell/component carrier) of a FDD system can be considered as a DL Scell and an uplink bandwidth (or a cell/component carrier) of the FDD system can be defined to be considered as a ghost cell.

The downlink subframe set and the uplink subframe set on a bandwidth (or a cell/component carrier) of the TDD system are configured to be considered as a DL PCell and a UL PCell, respectively. A downlink bandwidth (or a cell/component carrier) of a FDD system can be considered as a ghost cell and an uplink bandwidth (or a cell/component carrier) of the FDD system can be defined to be considered as a UL Scell.

The downlink subframe set and the uplink subframe set on a bandwidth (or a cell/component carrier) of the TDD system are configured to be considered as a DL PCell and a ghost cell, respectively. A downlink bandwidth (or a cell/component carrier) of a FDD system can be considered as a DL SCell and an uplink bandwidth (or a cell/component carrier) of the FDD system can be defined to be considered as a UL PCell.

The downlink subframe set and the uplink subframe set on a bandwidth (or a cell/component carrier) of the TDD system are configured to be considered as a DL PCell and a UL SCell, respectively. A downlink bandwidth (or a cell/component carrier) of a FDD system can be considered as a ghost cell and an uplink bandwidth (or a cell/component carrier) of the FDD system can be defined to be considered as a UL PCell.

The downlink subframe set and the uplink subframe set on a bandwidth (or a cell/component carrier) of the TDD system are configured to be considered as a ghost cell and a UL PCell, respectively. A downlink bandwidth (or a cell/component carrier) of a FDD system can be considered as a DL PCell and an uplink bandwidth (or a cell/component carrier) of the FDD system can be defined to be considered as a UL Scell.

The downlink subframe set and the uplink subframe set on a bandwidth (or a cell/component carrier) of the TDD system are configured to be considered as a DL SCell and a UL PCell, respectively. A downlink bandwidth (or a cell/component carrier) of a FDD system can be considered as a DL PCell and an uplink bandwidth (or a cell/component carrier) of the FDD system can be defined to be considered as a ghost cell.

The downlink subframe set and the uplink subframe set on a bandwidth (or a cell/component carrier) of the TDD system are configured to be considered as a ghost cell and a UL SCell, respectively. A downlink bandwidth (or a cell/component carrier) of a FDD system can be considered as a DL PCell and an uplink bandwidth (or a cell/component carrier) of the FDD system can be defined to be considered as a UL PCell.

The downlink subframe set and the uplink subframe set on a bandwidth (or a cell/component carrier) of the TDD system are configured to be considered as a DL SCell and a ghost cell, respectively. A downlink bandwidth (or a cell/component carrier) of a FDD system can be considered as a DL PCell and an uplink bandwidth (or a cell/component carrier) of the FDD system can be defined to be considered as a UL PCell.

And, according to the present invention, in case of using a FDD system and a TDD system with a carrier aggregation scheme, uplink data (e.g., PUSCH), which is transmitted in an uplink subframe on a bandwidth (or a cell/component carrier) of the TDD system, can be configured to be transmitted based on scheduling information (e.g., UL grant) transmitted in a downlink subframe on the bandwidth (or a cell/component carrier) of the TDD system. Moreover, uplink data (e.g., PUSCH), which is transmitted in an uplink subframe on a bandwidth (or a cell/component carrier) of the TDD system, can be configured to be transmitted based on scheduling information (e.g., UL grant) transmitted in a downlink subframe on the same bandwidth (or a cell/component carrier) of the TDD system only when the downlink subframe on the bandwidth (or a cell/component carrier) of the TDD system is configured to be considered as a DL PCell resource. In this case, if the downlink subframe on the bandwidth (or a cell/component carrier) of the TDD system is configured to be considered as a DL SCell resource, it is able to exceptionally configure the uplink data (e.g., PUSCH) to be transmitted based on scheduling information (e.g., UL grant) transmitted in a downlink subframe on a DL PCell.

And, according to the present invention, uplink data (e.g., PUSCH), which is transmitted in an uplink subframe on a bandwidth (or a cell/component carrier) of the TDD system, can be configured to be transmitted based on scheduling information (e.g., UL grant) transmitted in a downlink subframe on a DL PCell.

Additionally, if a subframe in which uplink data (e.g., PUSCH) is transmitted and a subframe in which uplink scheduling information (e.g., UL grant) is transmitted are considered as resources belonging to cells (or component carriers) different from each other, although the corresponding uplink/downlink subframes actually exist on a same bandwidth (or a cell/component carrier), it may be considered as a cross carrier scheduling (CCS) operation.

And, according to the present invention, in case of using a FDD system and a TDD system with a carrier aggregation scheme, UL ACK/NACK can be configured to be transmitted on an uplink control channel (e.g., PUCCH) on a UL PCell in response to reception of downlink data. Or, the UL ACK/NACK can be configured to be transmitted on an uplink control channel (e.g., PUCCH) on a bandwidth identical to a bandwidth on which the downlink data is received.

And, according to the present invention, in case of using a FDD system and a TDD system with a carrier aggregation scheme, an uplink subframe set and/or a downlink subframe set on a same bandwidth (or a cell/component carrier) can be configured to be considered as resources belonging to cell (component carrier) types different from each other (e.g., UL PCell/Scell, DL PCell/Scell). In this case, a CIF index (carrier indicator field) interlocked with downlink control information/downlink data information and a CIF index interlocked with scheduling information (e.g., UL grant) of uplink data transmitted in an uplink subframe can be differently configured.

For instance, a CIF index interlocked with downlink control information/downlink data information, which is transmitted in a downlink subframe of a bandwidth (or a cell/component carrier) of a TDD system, is set to 0 (i.e., DL PCell) and a CIF index interlocked with scheduling information (e.g., UL grant) of uplink data, which is transmitted in an uplink subframe, is set to a different value except 0 (e.g., a value among values ranging from 1 to 7) (i.e., UL Scell).

And, according to the present invention, in case of using a FDD system and a TDD system with a carrier aggregation scheme, a downlink bandwidth (or a cell/component carrier) of the FDD system and/or an uplink bandwidth (or a cell/component carrier) of the FDD system and/or a bandwidth (or a cell/component carrier) of the TDD system are segmented according to a predetermined configuration/ratio and at least one of the segmented bandwidths can be configured to be aggregated with a bandwidth (or a cell/component carrier) of the TDD system based on the carrier aggregation scheme. By doing so, resource waste of a bandwidth (or a cell/component carrier) configured as a ghost cell can be reduced.

The aforementioned examples/embodiments/methods of the present invention for explaining the present invention can be included as an example for implementing the present invention. It is apparent that the examples/embodiments/methods correspond to a technical solution for solving the technical tasks of the present invention Each of the aforementioned various embodiments of the present invention can be independently executed. Yet, in some cases, although a part of at least one or more embodiments of the present invention is combined with each other or all of the embodiments are combined with each other, it is apparent that it is included in the scope of the technical solution proposed by the present invention.

Figure 15:
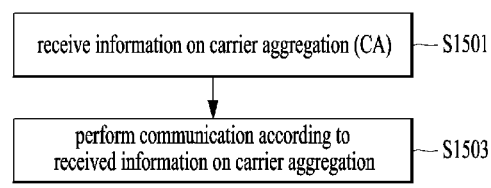
FIG. 15 is a flowchart for a communication method using carrier aggregation according to a preferred embodiment of the present invention.

FIG. 15 is a flowchart for a communication method using carrier aggregation according to a preferred embodiment of the present invention.

Referring to FIG. 15, a user equipment (UE) receives information for performing wireless communication using carrier aggregation (CA) from a base station (BS) [S1501].

In particular, in the step S1501, the UE can receive information on the CA according to one embodiment of the present invention from the BS. In the step S1501, in order for the UE to perform communication using a carrier aggregation scheme, information/configuration/rule and the like can be configured according to what is mentioned earlier in the embodiments of the present invention. In some cases, the information/configuration/rule can be determined by a combination of at least a part of the embodiments of the present invention.

In the step S1501, the UE can perform communication with the BS according to the received information on the CA [S1503].

The communication method using the CA of the present invention mentioned earlier with reference to FIG. 15 can be performed in a manner of independently applying items explained in the aforementioned various embodiments of the present invention or applying two or more embodiments at the same time. For clarity, explanation on overlapped contents is omitted at this time.

Figure 16:
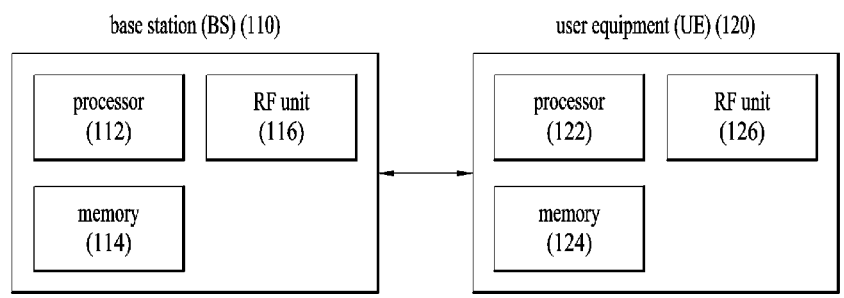
FIG. 16 is a diagram for an example of a base station and a user equipment capable of being applied to an embodiment of the present invention.

FIG. 16 is a diagram for an example of a base station and a user equipment capable of being applied to an embodiment of the present invention. If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 16, a wireless communication system includes a base station (BS) 110 and a user equipment (UE) 120. The BS 110 includes a processor 112, a memory 114 and a radio frequency (RF) unit 116. The processor 112 can be configured to implement the proposed functions, processes and/or methods. The memory 114 is connected with the processor 112 and then stores various kinds of information associated with an operation of the processor 112. The RF unit 116 is connected with the processor 112 and transmits and/or receives a radio signal. The user equipment 120 includes a processor 122, a memory 124 and a radio frequency (RF) unit 126. The processor 122 can be configured to implement the proposed functions, processes and/or methods. The memory 124 is connected with the processor 122 and then stores various kinds of information associated with an operation of the processor 122. The RF unit 126 is connected with the processor 122 and transmits and/or receives a radio signal. The base station 110 and/or the user equipment 120 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of performing communication using carrier aggregation in a wireless communication system and an apparatus therefor are described centering on examples applied to 3GPP LTE system, it may be applicable to various kinds of wireless communication systems as well as to the 3GPP LTE system.

What is claimed is:

1. A method of transceiving a signal by a user equipment in a wireless communication system supporting carrier aggregation, comprising the steps of:
receiving information on component carriers (CCs) for the user equipment;
wherein when a first CC is in a frequency division duplex (FDD) mode and a second CC is in a time division duplex (TDD) mode according to the information, the information indicates:
a first downlink CC in the FDD mode or a first uplink CC in the FDD mode is not to be used; or
downlink subframes of the second CC in the TDD mode or uplink subframes of the second CC in the TDD mode are not to be used, and
transceiving the signal according to the information.

2. The method of claim 1, wherein the information further indicates the downlink subframes of the second CC in the TDD mode to be used as a primary CC for downlink communication, the uplink subframes of the second CC in the TDD mode to be used as a primary CC for uplink communication, the first downlink CC in the FDD mode to be used as a secondary CC for the downlink communication and the first uplink CC in the FDD mode not to be used.

3. The method of claim 1, wherein the information further indicates the downlink subframes of the second CC in the TDD mode to be used as a primary CC for downlink communication, the uplink subframes of the second CC in the TDD mode to be used as a primary CC for uplink communication, the first uplink CC in the FDD mode to be used as a secondary CC for the uplink communication and the first downlink CC in the FDD mode not to be used.

4. The method of claim 1, wherein the information further indicates the downlink subframes of the second CCs in the TDD mode to be used as a primary CC for downlink communication, the first uplink CC in the FDD mode to be used as a primary CC for the uplink communication, the first downlink CC in the FDD mode to be used as a secondary CC for the downlink communication and the uplink subframes of the second CC in the TDD mode not to be used.

5. The method of claim 1, wherein the information further indicates the first uplink CC in the FDD mode to be used as a primary CC for uplink communication, the downlink subframes of the second CC in the TDD mode to be used as a primary CC for the downlink communication, the uplink subframes of the second CC in the TDD mode to be used as a secondary CC for the uplink communication and the first downlink CC in the FDD mode not to be used.

6. The method of claim 1, wherein the information further indicates the uplink subframes of the second CC in the TDD mode to be used as a primary CC for uplink communication, the first downlink CC in the FDD mode to be used as a primary CC for downlink communication, the first uplink CC in the FDD mode to be used as a secondary CC for the uplink communication and the downlink subframes of the second CC in the TDD mode not to be used.

7. The method of claim 1, wherein the information further indicates the first downlink CC in the FDD mode to be used as a primary CC for downlink communication, the uplink subframes of the second CC in the TDD mode to be used as a primary CC for uplink communication, the downlink subframes of the second CC in the TDD mode to be used as a secondary CC for the downlink communication and the first uplink CC in the FDD mode not to be used.

8. The method of claim 1, wherein the information further indicates the first downlink CC in the FDD mode to be used as a primary CC for downlink communication, the first uplink CC in the FDD mode to be used as a primary CC for uplink communication, the uplink subframes of the second CC in the TDD mode to be used as a secondary CC for the uplink communication and downlink subframes of the second CC in the TDD mode not to be used.

9. The method of claim 1, wherein the information further indicates the first downlink CC in the FDD mode to be used as a primary CC for downlink communication, the first uplink CC in the FDD mode to be used as a primary CC for uplink communication, the downlink subframes of the second CC in the TDD mode to be used as a secondary CC for the downlink communication and uplink subframes of the second CC in the TDD mode not to be used.

10. A user equipment (UE) for transceiving a signal in a wireless communication system supporting carrier aggregation, the UE comprises:
  a radio frequency unit; and
  a processor,
  wherein the processor is configured to:
  receive information on component carriers (CCs) for the UE,
  wherein when a first CC is in a frequency division duplex (FDD) mode CC and a second CC is in a time division duplex (TDD) mode CC according to the information, the information indicates:
  a first downlink CC in the FDD mode or a first uplink CC in the FDD mode is not to be used; or
  downlink subframes of the second CC in the TDD mode or uplink subframes of the second CC in the TDD mode are not to be used, and
  transceive the signal according to the information.

* * * * *